(12) United States Patent
Tonelli et al.

(10) Patent No.: US 10,533,071 B2
(45) Date of Patent: Jan. 14, 2020

(54) MIXTURES OF MONO-, BI- AND NON-FUNCTIONAL FLUORINATED POLYMERS COMPRISING A PLURALITY OF (PER)FLUOROPOLYETHER SEGMENTS

(71) Applicant: SOLVAY SPECIALTY POLYMERS ITALY S.P.A., Bollate (IT)

(72) Inventors: Claudio Adolfo Pietro Tonelli, Paderno D'adda (IT); Ivan Wlassics, Garessio (IT); Giuseppe Marchionni, Milan (IT); Letanzio Bragante, Due Carrare (IT)

(73) Assignee: SOLVAY SPECIALTY POLYMERS ITALY S.P.A., Bollate (MI) (IT)

( * ) Notice: Subject to any disclaimer, the term of this patent is extended or adjusted under 35 U.S.C. 154(b) by 48 days.

(21) Appl. No.: 15/531,092

(22) PCT Filed: Nov. 23, 2015

(86) PCT No.: PCT/EP2015/077304
§ 371 (c)(1),
(2) Date: May 26, 2017

(87) PCT Pub. No.: WO2016/083280
PCT Pub. Date: Jun. 2, 2016

(65) Prior Publication Data
US 2017/0327641 A1  Nov. 16, 2017

(30) Foreign Application Priority Data
Nov. 27, 2014  (EP) ................... 14195158

(51) Int. Cl.
*C08G 65/323* (2006.01)
*C08G 65/00* (2006.01)
*C08G 65/334* (2006.01)
*C08L 71/02* (2006.01)

(52) U.S. Cl.
CPC ..... *C08G 65/3236* (2013.01); *C08G 65/3346* (2013.01); *C08L 71/02* (2013.01); *C08L 2205/025* (2013.01)

(58) Field of Classification Search
CPC .. C08G 65/3236; C08G 65/007; C08G 65/30; C08G 65/3346; C08L 71/02; C08L 2205/025
USPC ........................................ 525/527
See application file for complete search history.

(56) References Cited

U.S. PATENT DOCUMENTS

| 5,246,588 A | 9/1993 | Tonelli et al. |
| 5,910,614 A | 6/1999 | Turri et al. |
| 7,288,682 B2 | 10/2007 | Tchistiakov et al. |
| 2015/0235664 A1* | 8/2015 | Deng ................ G11B 5/725 360/75 |

FOREIGN PATENT DOCUMENTS

| EP | 538827 A2 | 4/1993 |
| EP | 1614703 A1 | 1/2006 |
| EP | 1810987 A1 | 7/2007 |
| EP | 2100909 A1 | 9/2009 |
| EP | 2089443 B1 | 7/2010 |
| WO | 2010057691 A2 | 5/2010 |
| WO | 2013060658 A1 | 5/2013 |
| WO | 2014090649 A1 | 6/2014 |

OTHER PUBLICATIONS

Briza T. et al., "Electrophilic polyfluoroalkylating agents based on sulfonate esters", Journal of Fluorine Chemistry, 2008, vol. 129, p. 235-247—Elsevier BV.
Rakhimov A.V. et al., "New Catalytic Synthesis of Polyfluoroalkyl Chlorosulfites", Russian Journal of General Chemistry, 2004, vol. 74, No. 5, p. 799-800.
Rakhimov A.V. et al., "Synthesis of di(polyfluoroalkyl)ethers.", Russian Journal of General Chemistry, 2004, vol. 77, No. 4, p. 1561-1563.
Tonelli C. et al., "Linear perfluoropolyethers difunctional oligomers: chemistry, properties and applications", Journal of Fluorine Chemistry, 1999, vol. 95, p. 51-70.
Tonelli C. et al., "Perfluoropolyether functional oligomers: unusual reactivity in organic chemistry", Journal of Fluorine Chemistry, Dec. 2002, vol. 118, No. 1-2, p. 107-121.
Scicchitano M. et al., "Cyclic acetals of fluorinated polyether alcohols", Journal of Fluorine Chemistry, 1999, vol. 95, p. 97-103.

* cited by examiner

*Primary Examiner* — David T Karst

(57) ABSTRACT

Disclosed are mixtures containing: mono- and bi-functional polymers [polymers (P-A) and (P—B)] comprising a plurality of (per)fluoropolyether segments [segments ($S^{RF}$)] joined together by hydrogenated (poly)ether segments [segments ($S^H$)], said polymers having two ends, wherein one or both ends comprises a hydroxy or a leaving group; a non-functional polymer comprising a plurality of (per)fluoropolyether segments ($S^{RF}$) joined together by hydrogenated (poly)ether segments ($S^H$), with the proviso that the hydrogenated (poly)ether segments ($S^H$) are not segments of formula —$CH_2OCH_2OCH_2$—. Disclosed are also mono-functional polymers (P-A) that can be isolated from such mixtures. Methods for the obtainment of the mixtures and for separating the polymers therein contained are also provided, as well as methods of using the mixtures or each polymer therein contained as intermediates or building blocks for the synthesis of other polymers or as ingredients of compositions.

16 Claims, No Drawings

MIXTURES OF MONO-, BI- AND NON-FUNCTIONAL FLUORINATED POLYMERS COMPRISING A PLURALITY OF (PER)FLUOROPOLYETHER SEGMENTS

CROSS-REFERENCE TO RELATED APPLICATIONS

This application is a U.S. national stage entry under 35 U.S.C. § 371 of International Application No. PCT/EP2015/077304 filed Nov. 23, 2015, which claims priority to European application EP 14195158.2 filed on Nov. 27, 2014. The entire contents of these applications are explicitly incorporated herein by this reference.

TECHNICAL FIELD

The present invention relates to mixtures of mono-, bi- and non-functional fluorinated polymers and derivatives thereof, to methods for their manufacture and for the separation of the polymer components.

BACKGROUND ART (Per)fluoropolyethers (PFPE) are fluorinated polymers comprising a fully or partially fluorinated polyoxyalkylene chain that contains recurring units having at least one catenary ether bond and at least one fluorocarbon moiety. The most widespreadly known PFPE can be obtained by homopolymerization of hexafluoropropylene oxide (HFPO) or 2,2,3,3-tetrafluorooxetane and by photooxidation of tetrafluoroethylene (TFE) and/or hexafluoropropylene (HFP).

PFPE are in the form of oils under normal conditions and at relatively high or low temperature and, thanks to their stability, inertness, low volatility and outstanding rheological and tribological properties, they are useful in a variety of applications, mainly lubricant applications, wherein harsh conditions are reached (e.g. high temperatures, friction, etc . . . ).

One of the main problems in the synthesis of PFPE lies in the difficulty of obtaining PFPE with high molecular weight. Indeed, the currently available methods of synthesis allow obtaining PFPE having an average number molecular weight (Mn) usually ranging from 400 and 5,000. PFPE with (Mn) ranging from 3,500-5,000 are usually isolated from mixtures comprising PFPE with lower molecular weights. The isolation of monofunctional PFPE with high molecular weight is particularly difficult on an industrial scale and usually provides low yields.

There is therefore the need to provide a method for manufacturing PFPE having a wide range of molecular weights, in particular high molecular weights, said method being conveniently implementable on an industrial scale and allowing to isolate monofunctional PFPE with satisfactory yields.

PFPE can be divided into non-functional and functional; the former comprise a PFPE chain whose ends bear (per) haloalkyl groups, while the latter comprise a PFPE chain wherein at least one end comprises a functional group. Among functional PFPE, PFPE alcohols, in particular those terminating with one or two —CH$_2$OH groups, can be used as valuable intermediates for the manufacture of other PFPE. Indeed, the hydroxy group can react as a nucleophile or can be transformed into a leaving group that undergoes nucleophilic displacement.

BRIZA, Thomas, et al. Electrophilic polyfluoroalkylating agents based on sulfonate esters. *Journal of Fluorine Chemistry.* 2008, vol. 129, p. 235-247. disclose the synthesis of several sulfonate esters that can be used as electrophilic agents in the manufacture of a variety of compounds, including ethers from fluorinated and non-fluorinated alcohols. However, the reaction of such sulfonate esters with PFPE alcohols is neither disclosed nor suggested.

The following articles:

RAKHIMOV, A. V., et al. New Catalytic Synthesis of Polyfluoroalkyl Chlorosulfites. *Russian Journal of General Chemistry.* 2004, vol. 74, no. 5, p. 799-800.

RAKHIMOV, A. V., et al. Synthesis of di(polyfluoroalkyl)ethers. *Russian Journal of General Chemistry.* 2004, vol. 77, no. 4, p. 1561-1563. disclose the synthesis of polyfluoroalkyl chlorosulfites and their subsequent conversion to ethers. Such ethers comprise a connecting hydrogenated spacer of formula —CH$_2$OCH$_2$— between two fluorinated segments. However, the fluorinated starting materials used in the preparation of the chlorosulfites disclosed in the examples are not PFPE alcohols. When the Applicant tried to prepare chlorosulfites of PFPE diols following the teaching of the above articles, the desired chlorosulfite derivative was not obtained.

TONELLI, Claudio, et al. Linear perfluoropolyethers difunctional oligomers: chemistry, properties and applications. *Journal of Fluorine Chemistry.* 1999, vol. 95, p. 51-70. discloses the conversion of PFPE diols of formula:

commercially known as Fomblin® Z DOL,
and of corresponding ethoxylated derivatives of formula:

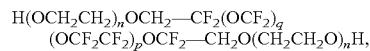

into the corresponding nonaflate and tosylate esters respectively. However, the article refers only to the reaction of nonaflate esters with NaI to provide the corresponding diiodide derivatives.

TONELLI, Claudio, et al. Perfluoropolyether functional oligomers: unusual reactivity in organic chemistry. *Journal of Fluorine Chemistry.* December 2002, vol. 118, no. 1-2, p. 107-121. reports and discusses the reactivity of functional PFPEs having hydroxy terminal groups and sulfonate terminal groups.

SCICCHITANO, Massimo, et al. Cyclic acetals of fluorinated polyether alcohols. *Journal of Fluorine Chemistry.* 1999, vol. 95, p. 97-103. disclose the reaction of Fomblin® Z DOL PFPE with dihalomethanes to provide a dihalogenated derivative which may react with Fomblin® Z DOL PFPE to provide polymers comprising PFPE segments and hydrogenated segments of formula —CH$_2$OCH$_2$OCH$_2$—. However, such segments are not stable and undergo hydrolysis under acid conditions.

EP 0538827 A (AUSIMONT SPA) 28 Apr. 1993 relates to a method for separating mono-, bi- and non-functional PFPEs, including PFPEs having CH$_2$OH terminations, by column chromatography.

EP 1614703 A (SOLVAY SOLEXIS SPA) 11 Jan. 2006 relates to a method for the separation of bifunctional PFPEs having —CH$_2$OH terminations from mixtures comprising the corresponding monofuntional compounds by absorption/desorption on a solid phase.

WO 2013/606558 discloses a process for increasing the content of bifunctional specied in PFPE mixtures having, inter alia, hydroxy terminations, by absorption/desorption on a stationary phase using a supercritical fluid and a polar solvent.

Polymers comprising both (per)fluoropolyoxyalkylene segments and fully hydrogenated segments are also known and can be used instead of PFPE in applications in which PFPE would be outperforming and/or too expensive, for example in the field of lubrication. For example, EP 2089443 B (SOLVAY SOLEXIS S.P.A.) 19 Aug. 2009 discloses non-functional block copolymers comprising PFPE blocks and blocks deriving from one or more homopolymerizable olefins. Such block copolymers can be manufactured by means of a process comprising the reaction of a peroxidic PFPE with one or more homopolymerizable olefins by radical route, thermal treatment and neutralization.

WO 2010/057691 A (SOLVAY SOLEXIS SPA) 27 May 2010 discloses, inter aka, bifunctional hydrofluoroalcohols comprising a plurality of (per)fluoropolyether (PFPE) segments joined together by $-O-R_h-O-$ segments, wherein $R_h$ is a hydrocarbon-based chain. For instance, Example 3 discloses a compound having formula:

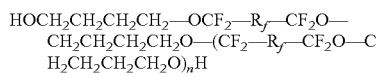

while example 8 discloses a compound of formula:

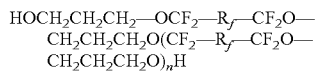

wherein $R_f$ is a PFPE chain.

Such compounds are obtained by reaction of a difunctional alkylating compound with a carbonyl derivative of a PFPE in the presence of a source of fluoride anion, followed by hydrolysis of the resulting product.

The need of finding novel polymers comprising PFPE segments and fully hydrogenated segments is still felt. In particular, there is the need to provide functional polymers comprising PFPE segments, said polymers having a wide range of molecular weights and, at the same time, being endowed with chemico-physical properties not significantly different from those of known PFPE polymers having the same molecular weight.

It would also be desirable to provide methods for manufacturing fluorinated polymers comprising PFPE segments and fully hydrogenated segments, said process being conveniently applicable on an industrial scale and allowing to modulate the molecular weight and the structure of the resulting fluorinated functional polymers and to obtain monofunctional PFPE with satisfactory yields. It would also be desirable to provide methods for transforming the polymers into further functional derivatives.

SUMMARY OF INVENTION

The present invention relates to mixtures [mixtures (M)] of polymers containing:
- mono- and bi- functional polymers [herein after respectively also referred to as polymers (P-A) and (P-B)] comprising a plurality of (per)fluoropolyether segments [segments ($S^{RF}$)] joined together by hydrogenated (poly)ether segments [segments ($S^H$)], said polymers having two ends, wherein one or both ends comprises a hydroxy or a leaving group;
- a non-functional polymer [herein after also referred to as "polymer (P-C)"] comprising a plurality of (per)fluoropolyether segments ($S^{RF}$) joined together by hydrogenated (poly)ether segments ($S^H$),
with the proviso that the hydrogenated (poly)ether segments ($S^H$) are not segments of formula $-CH_2OCH_2OCH_2-$.

For the sake of clarity, this proviso applies throughout the whole text.

Preferably, polymers (P) comprise at least two segments ($S^{RF}$). More preferably, polymers (P) comprise at least three segments ($S^{RF}$).

Segments ($S^{RF}$) can be equal to or different from one another; in one embodiment, a segment ($S^{RF}$) alternates with a segment ($S^{RF}$) having different molecular weight, structure or both, said ($S^{RF}$) segments being joined together by ($S^H$) segments.

The invention further relates to a method for the manufacture of mixtures (M) and to a method for the separation of the mono-, bi- and non-functional polymers therein contained.

In particular, the invention relates to a method for obtaining mixtures (M) enriched in mono-functional polymers (P-A) and to a method for isolating said monofunctional polymers. It has indeed been observed that, by appropriate selection of the reagents in terms of functionality and stoichiometric ratio, it is possible to maximize the content of monofunctional polymers (P-A) in mixtures (M).

Mixtures (M) and each of the polymers therein contained, in particular monofunctional polymers (P-A), can be submitted to fluorination in order to increase the fluorine content. Thus, the present invention further relates to a method for the manufacture of fluorinated polymers that comprises submitting a mixture (M) or a polymer therein contained to complete or partial fluorination.

Mixtures (M) and, in particular, monofunctional polymers (P-A), as well as the mixtures and the monofunctional polymers obtainable therefrom by complete or partial fluorination [herein after also referred to as "mixtures (M*) and "polymers (P*-A)"] are stable and can have a wide range of average number molecular weight, thereby being suitable, alone or in combination with other ingredients, for a variety of applications, in particular in lubrication applications and in applications wherein it is important to impart hydro-/oleo-repellence to organic or inorganic substrates.

Therefore, an object of the present application is a method of lubricating a surface, said method comprising applying to a surface to be lubricated a mixture (M) or a monofunctional polymer (P-A) and/or mixture (M*) or a monofunctional polymer (P*-A) obtainable therefrom by complete or partial fluorination. Object of the present invention is also a method for imparting hydro-/oleo-repellence to a substrate, said method comprising applying to said substrate mixture (M) or a monofunctional polymer (P-A) and/or a mixture (M*) or a monofunctional polymer (P*-A) obtainable therefrom by complete or partial fluorination.

Furthermore, mixture (M), monofunctional polymers (P-A), mixtures (M*) and monofunctional polymers (P*-A) can be conveniently used as intermediates or building blocks in the synthesis of other compounds or block-polymers.

GENERAL DEFINITIONS, SYMBOLS AND ABBREVIATIONS

For the purposes of the present description:
- the term "(per)fluoropolyether" stands for a fully or partially fluorinated polyether;
- the acronym "PFPE" stands for "(per)fluoropolyether"; when this acronym is used as substantive, it is to be intended in the singular or in the plural form, depending on the context;
- the term "(poly)ether" stands for ether or polyether;

the term "(per)haloalkyl" denotes a straight or branched alkyl group wherein one or more hydrogen atoms have been replaced with halogen atoms;

unless otherwise indicated, the term "halogen" includes fluorine, chlorine, bromine or iodine;

the expression "hydrogenated (poly)ether segment" denotes a (poly)ether segment comprising only C, H and O atoms;

the use of parentheses "( . . . )" before and after symbols or numbers identifying formulae or parts of formulae like, for example, segment (SRF), segment ($S^H$), polymer (P), etc . . . , has the mere purpose of better distinguishing that symbol or number from the rest of the text; thus, said parentheses could also be omitted;

in monofunctional polymer (P-A), one end comprises a hydroxy or a leaving group and the other end terminates with a (per)haloalkyl group;

in bifunctional polymer (P-B), each end comprises a hydroxy or a leaving group;

in non-functional polymer (P-C), each end terminates with a (per)haloalkyl group;

a "leaving group" is an anionic molecular fragment able to depart with a pair of electrons and to form a stable anion in heterolytic bond cleavage when the molecule to which said group is bound is reacted with a nucleophile compound. Preferably, the leaving group is a sulfonate group. Typically, the sulfonate group is a (halo)alkyl sulfonate group, preferably a fluoroalkyl sulfonate group, or an aryl sulfonate group, preferably a phenyl sulfonate group, wherein the aryl or phenyl moiety optionally bears one or more (halo)alkyl substituents, preferably (fluoro)alkyl substituents. Preferred sulfonate groups are trifluoromethanesulfonate (triflate), nonafluorobutanesulfonate (nonaflate) and p-toluenesulfonyl (tosylate);

the expression "as defined above" is intended to comprise all generic and specific or preferred definitions referred to by that expression in preceding parts of the description.

Mixtures (M) and Polymers Therein Contained

Mixtures (M) according to the present invention typically comply with the following general formula (M-I):

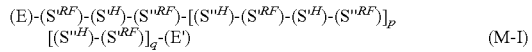

(M-I)

wherein:
$(S^{\prime RF})$ and $(S^{\prime\prime RF})$, equal to or different from one another, are (per)fluoropolyether segments $(S^{RF})$ as defined above;

$(S^{\prime H})$ and $(S^{\prime\prime H})$, equal to or different from one another, are hydrogenated (poly)ether segments $(S^H)$ as defined above;

(E) and (E'), equal to or different from one another, represent a group comprising a hydroxy or a leaving group as defined above or a (per)haloalkyl group;

p is 0 or a positive number and q is 0 or 1.

A first preferred embodiment of the invention is represented by mixtures (M) comprising polymers in which both p and q are 0.

A second preferred embodiment of the invention is represented by mixtures (M) comprising polymers in which p is 0 or 1 and q is 1. Most preferred are mixtures (M) comprising polymers in which p is 0 and q is 1.

A preferred group of mixtures (M) comprises polymers in which p is as defined above, preferably 0 or 1, q is 1 and segments $(S^{\prime RF})$ and $(S^{\prime\prime RF})$ are alternating segments differing from each other in the structure and/or molecular weight. More preferably, segments $(S^{\prime\prime RF})$ differ from segments $(S^{\prime RF})$ in the molecular weight.

Segments $(S^{RF})$

Segments $(S^{RF})$ comprise a fully or partially fluorinated polyoxyalkylene chain [herein after "chain $(R_f)$"] comprising recurring units (R°) having at least one catenary ether bond and at least one fluorocarbon moiety.

Typically, chain $(R_f)$ has a number average molecular weight ranging from 400 to 5,000 and comprises recurring units (R°) selected from:

(i) —CFXO—, wherein X is F or $CF_3$, (ii) —CFXCFXO—, wherein X, equal or different at each occurrence, is F or $CF_3$, with the proviso that at least one of X is —F, (iii) —$CF_2CF_2CW_2O$—, wherein each of W, equal or different from each other, are F, Cl, H, (iv) —$CF_2CF_2CF_2CF_2O$—, (v) —$(CF_2)_j$—$CFZ^*$—O— wherein j is an integer from 0 to 3 and $Z^*$ is a group of general formula —$OR_f^*T$, wherein $R_f^*$ is a fluoropolyoxyalkene chain comprising a number of repeating units from 0 to 10, said recurring units being chosen among the followings: —CFXO—, —$CF_2CFXO$—, —$CF_2CF_2CF_2O$—, —$CF_2CF_2CF_2CF_2O$—, with each of each of X being independently F or $CF_3$ and T being a $C_1$-$C_3$ perfluoroalkyl group.

Preferably, chain $(R_f)$ complies with the following formula:

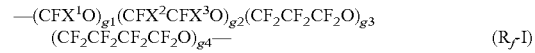

$(R_f\text{-I})$ wherein:
$X^1$ is independently selected from —F and —$CF_3$, $X^2$, $X^3$, equal or different from each other and at each occurrence, are independently —F, —$CF_3$, with the proviso that at least one of X is —F;

g1, g2, g3, and g4, equal or different from each other, are independently integers ≥0, such that g1+g2+g3+g4 is in the range from 2 to 300, preferably from 2 to 100; should at least two of g1, g2, g3 and g4 be different from zero, the different recurring units are generally statistically distributed along the chain.

More preferably, chain $(R_f)$ is selected from chains of formula:

$(R_f\text{-IIA})$ wherein:
a1 and a2 are independently integers ≥0 such that the number average molecular weight is between 400 and 5,000; both a1 and a2 are preferably different from zero, with the ratio a1/a2 being preferably comprised between 0.1 and 10;

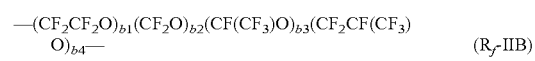

$(R_f\text{-IIB})$ wherein:
b1, b2, b3, b4, are independently integers ≥0 such that the number average molecular weight is between 400 and 10,000, preferably between 400 and 5,000; preferably b1 is 0, b2, b3, b4 are >0, with the ratio b4/(b2+b3) being ≥1;

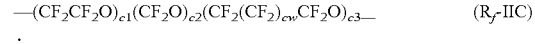

$(R_f\text{-IIC})$ wherein:
cw=1 or 2;

c1, c2, and c3 are independently integers ≥0 chosen so that the number average molecular weight is between 400 and 10,000, preferably between 400 and 5,000; preferably c1, c2 and c3 are all >0, with the ratio c3/(c1+c2) being generally lower than 0.2;

$$—(CF_2CF(CF_3)O)_d— \quad (R_f\text{-IID})$$

wherein:
d is an integer >0 such that the number average molecular weight is between 400 and 5,000;

$$—(CF_2CF_2C(Hal)_2O)_{e1}—(CF_2CF_2CH_2O)_{e2}— \\ (CF_2CF_2CH(Hal)O)_{e3}— \quad (R_f\text{-IIE})$$

wherein:
Hal, equal or different at each occurrence, is a halogen selected from fluorine and chlorine atoms, preferably a fluorine atom;
e1, e2, and e3, equal to or different from each other, are independently integers ≥0 such that the (e1+e2+e3) sum is comprised between 2 and 300.

Still more preferably, chain ($R_f$) complies with formula ($R_f$-III) here below:

$$—(CF_2CF_2O)_{a1}(CF_2O)_{a2}— \quad (R_f\text{-III})$$

wherein:
a1, and a2 are integers >0 such that the number average molecular weight is between 400 and 4,000, with the ratio a2/a1 being generally comprised between 0.2 and 5.

Segments ($S^{RF}$) may optionally comprise a chain ($R_f$) wherein two CFX—O-units are joined together by a straight or branched alkylene segment ($R_h^\circ$), preferably a $C_1$-$C_{20}$ straight or branched alkylene segment. Such segments ($S^{RF}$) comply with formula ($S_a$RF):

$$—(R^\circ_f)—CFX—[O—R_h^\circ—O—CFX—(R^{\circ\prime}_f)— \\ CFX]_{nsf}— \quad (S_a^{RF})$$

in which X and $R_h^\circ$ are as defined above, ($R^\circ_f$) and ($R^{\circ\prime}_f$), equal to or different from one another, are chains $R_f$ as defined above and nsf is an integer ranging from 1 to 200.

Hydrogenated (Poly)Ether Segments (SH)

Hydrogenated (poly)ether segments are straight or branched divalent (poly)oxyalkylene segments comprising at least two carbon atoms, with the exception of the segment of formula —$CH_2OCH_2OCH_2$—. For the sake of clarity, this exception applies throughout the whole description.

Segments ($S^H$) and ($S^H$) can be represented with formula:

$$—R_h—O—R_h'— \quad (S^H\text{—I})$$

wherein ($R_h$) and ($R_h'$), equal to or different from one another, are selected from straight or branched divalent alkylene segments, each comprising at least one carbon atom; when ($R_h$) and ($R_h'$) comprise more than one carbon atom, they can optionally be interrupted by one or more ethereal oxygen atoms.

In one embodiment, segments ($S^H$—I) comprise segments of formula:

$$—R_h^\circ—O—R_h^\circ— \quad (S^{\circ H}\text{-I})$$

wherein $R_h^\circ$ is as defined above.

Mixture (M) wherein segments ($S^{RF}$) comply with formula ($S_a^{RF}$) comprise segments ($S^{\circ H}$-I).

Groups ($R_h$) preferably comply with formula ($R_h$-I) below:

$$—(CH_2)_m(OCH_2CHY)_n— \quad (R_h\text{-I})$$

wherein m is 0 or 1, n is 0 or an integer equal to or higher than 1, preferably ranging from 1 to 10, and Y is hydrogen or methyl, preferably hydrogen, with the proviso that, when m is 0, n is at least 1. In a preferred embodiment, m is 1 and n is 0 or 1.

Groups ($R_h'$) preferably comply with formula ($R_h'$-I) below:

$$—(CHY'CH_2O)_{n'}(CH_2)_{m'}— \quad (R_h'\text{-I})$$

wherein Y' is hydrogen or methyl, preferably hydrogen, and n' is 0 or an integer equal to or higher than 1, preferably ranging from 1 to 10 and m' is 0 or 1, with the proviso that, when m' is 0, n' is at least 1. In a preferred embodiment m' is 1 and n' is 0 or 1.

According to a preferred embodiment, in groups ($R_h$-I) and groups ($R_h'$-I), m and m' are both 1, n is equal to n' and Y is equal to Y'.

Thus, segments ($S^H$) preferably comply with formula ($S^H$-1) below ($S^H$-1) —$(CH_2)_m(OCH_2CHY)_nO$ $(CHY'CH_2O)_{n'}(CH_2)_{m'}$—, wherein m, m', n, n', Y and Y', equal to or different from one another, are as defined above. According to a preferred embodiment, m and m' are both 1, n is equal to n' and Y is equal to Y'. According to another preferred embodiment, when either n or n' is other than 0, Y and Y' are hydrogen. According to still another preferred embodiment, m and m' are both 1 and n and n' are 0.

Preferred segments ($S^H$—I) are those complying formula ($S^H$-1A) or ($S^H$-1B) below:

$$—CH_2OCH_2—; \quad (S^H\text{-1A})$$

$$—CH_2OCH_2CH_2OCH_2—. \quad (S^H\text{-1B})$$

End Groups (E) and (E')

End groups (E) and (E') are selected from:
a functional group ($G^F$) comprising a hydroxy or a leaving group as defined above and
a non-functional group ($G^{NF}$) comprising a straight or branched (per)haloalkyl group.

Preferably, a functional group ($G^F$) is a straight or branched alkyl group comprising at least one carbon atom, optionally interrupted by ethereal oxygen atoms, said groups comprising a hydroxy or a leaving group as defined above.

Preferably, a non-functional group ($G^{NF}$) is a straight or branched (per)haloalkyl group, preferably a $C_1$-$C_6$ (per)haloalkyl group; typically, ($G^{NF}$) is a $C_1$-$C_3$ haloalkyl group selected from —$CF_3$, —$CF_2Cl$, —$CF_2CF_2Cl$, —$C_3F_6Cl$, —$CF_2Br$, —$CF_2CF_3$, —$CF_2H$, —$CF_2CF_2H$, —$CH_2(CF_2)_{a'}CF_3$, wherein a' ranges from 0 to 3, —$CH(CF_3)_2$ and —$C(CF_3)_3$.

Thus, mixtures (M-I) contain the polymers complying with formulae (P-IA)-(P-IC) below:

monofunctional polymers (P-IA):

$$(G^{NF})\text{-}(S^{\prime RF})\text{-}(S^{\prime H})\text{-}(S^{\prime\prime RF})\text{-}[(S^{\prime\prime\prime H})\text{-}(S^{\prime RF})—(S^{\prime H})\text{-} \\ (S^{\prime\prime RF})]_p[(S^{\prime\prime\prime H})\text{-}(S^{\prime RF})]_q\text{-}(G^F) \quad (P\text{-IA})$$

bifunctional polymers (P-IB)

$$(G^F)—(S^{\prime RF})—(S^{\prime H})—(S^{\prime\prime RF})—[(S^{\prime\prime\prime H})—(S^{\prime RF})— \\ (S^{\prime H})—(S^{\prime\prime RF})]_p[(S^{\prime\prime\prime H})—(S^{\prime RF})]_q\text{-}(G^F) \quad (P\text{-IB})$$

and non-functional polymers (P-IC):

$$(G^{NF})\text{-}(S^{\prime RF})\text{-}(S^{\prime H})\text{-}(S^{\prime\prime RF})\text{-}[(S^{\prime\prime\prime H})\text{-}(S^{\prime RF})\text{-}(S^{\prime H})\text{-}(S^{\prime\prime RF})]_p \\ [(S^{\prime\prime\prime H})\text{-}(S^{\prime RF})]_q\text{-}(G^{NF}). \quad (P\text{-IC})$$

wherein ($G^{NF}$), ($G^F$), ($S^{\prime RF}$), ($S^{\prime\prime RF}$), ($S^{\prime H}$), ($S^{\prime\prime\prime H}$), p and q are as defined above.

Preferred mixtures (M-I) comply with formula (M-II) below:

$$(E)\text{-}(S^{RF})\text{-}(R_h)O(R_h')\text{-}(S^{\prime\prime RF})\text{-}[(R_h')O(R_h)\text{-}(S^{\prime RF})\text{-}(R_h) \\ O(R_h')\text{-}(S^{\prime\prime RF})]_p\text{-}[(R_h')O(R_h)\text{-}(S^{\prime RF})]_q\text{-}(E') \quad (M\text{-II})$$

wherein (E), (E'), ($S'^{RF}$), ($S''^{RF}$), ($R_h$), ($R_h'$), p and q are as defined above.

Mixtures (M-II) contain the polymers complying with formulae (P-IIA)-(P-IIC) below:

monofunctional polymers (P-IIA)

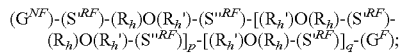

bifunctional polymers (P-IIB)

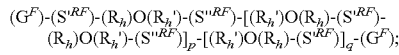

and non-functional polymers (P-IIC)

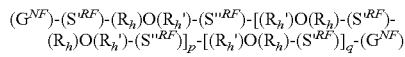

wherein ($G^{NF}$), ($G^F$), ($S'^{RF}$), ($S''^{RF}$), ($R_h$) and ($R_h'$) are as defined above.

Preferred mixtures (M-I) and (M-II) according to the present invention are those in which:

functional groups ($G^F$) comply with formula —$CH_2E^1$, wherein $E^1$ is independently selected from hydroxy, nonaflate, triflate and tosylate;

non-functional groups ($G^{NF}$) are independently selected from groups ($G^{NF}$) indicated above;

($S'^{RF}$) and ($S''^{RF}$), equal to or different from one another, are straight PFPE segments comprising a chain ($R_f$) complying with formula ($R_f$-III) as defined above;

($R_h$) and ($R_h'$) are both —$CH_2$— or one is —$CH_2$— and the other one is —$CH_2CH_2$—.

Preferred segments ($S'^{RF}$) and ($S''^{RF}$) are those of formulae —$CF_2OR_fCF_2$— and —$CF_2OR'_fCF_2$—, wherein ($R_f$) and ($R'_f$), equal to or different from one another, comply with formula ($R_f$-III) as defined above.

Monofunctional polymers contained in mixtures (M) represent a preferred embodiment of the invention. Preferably, monofunctional polymers comply with formulae (P-IA) and (PII-A) as defined above.

Manufacture of Mixtures (M) and Separation of the Polymers Therein Contained

A further object of the present invention is a method for the manufacture of mixtures (M) as defined above and for the separation of the polymers therein contained. The method is particularly convenient because it allows obtaining polymers having a wide range of molecular weight and chemico-physical properties similar to those of corresponding PFPE polymers. In particular, the process is advantageous in that it allows obtaining monofunctional polymers (P-A) with high molecular weights, such as higher than 4,000, in an easier way with respect to the currently available methods and with satisfactory yields.

The method according to the invention envisages the reaction of a PFPE diol (Diol-1) with a PFPE diol whose hydroxy end groups are activated to nucleophilic substitution [activated (Diol-1*)] in the presence of an inorganic or organic base and wherein the average functionality (F-1) of (Diol-1) is equal to or higher than the functionality (F-1*) of activated ( Diol-1*) or vice-versa, with the proviso that the overall average functionality [(F-1)+(F-1*)]/2 is lower than 1.98.

Preferred activated (Diol-1*) are those in the form of sulfonic esters, i.e. those in which the hydroxy groups have been converted into sulfonate groups as defined above.

Average functionalities (F-1) and (F-1*) represent the average number of hydroxy or activated hydroxy end groups per (Diol-1) and (Diol-*) respectively and can be calculated according to methods known in the art, for example as disclosed in EP 1810987 A (SOLVAY SOLEXIS S.P.A.) 25 Jul. 2007.

In a first embodiment, (Diol-1) and activated (Diol-1*) have the same average functionalities, ranging from 1.2 to <1.98, more preferably from 1.3 to 1.90, even more preferably from 1.4 to 1.6.

In a second embodiment, (Diol-1) and activated (Diol-1*) have different average functionalities; preferably, (Diol-1) or activated (Diol-1*) has an average functionality equal to or higher than 1.98, while the other one has an average functionality lower than 1.98, preferably ranging from 1 to less than 1.98, more preferably ranging from 1 to 1.80, even more preferably from 1.4 to 1.6, with the proviso that [(F-1)+(F-1*)]/2 is lower than 1.98. Typically, when the average functionality of either (Diol-1) or ( Diol-1*) is equal to or higher than 1.98 and the average functionality of the other diol ranges from 1.4 to 1.6, the yield of monofunctional polymers (P-A) is maximized.

Typically, (Diol-1) complies with formula (Diol-1A) below:

(Diol-1A)  Z—O—$R_f$—Z' wherein ($R_f$) is a fluoropolyoxyalkylene chain as defined above and Z and Z', equal to or different from one another, represent a hydrocarbon group containing one hydroxy group, said hydrocarbon group being partially fluorinated and optionally containing one or more ethereal oxygen atoms, or a $C_1$-$C_3$ haloalkyl group, typically selected from —$CF_3$, —$CF_2Cl$, —$CF_2CF_2$ Cl, —$C_3F_6Cl$, —$CF_2Br$, —$CF_2CF_3$ and —$CF_2H$, —$CF_2CF_2H$.

Preferred groups Z and Z' comply with formula:

(Z-1)  —$(CH_2)_m*(OCH_2CHY*)_n*$-OH wherein m* is 0 or 1 and Y* and n* are as defined above, with the proviso that, when m* is 0, n* is at least 1.

Preferred diols of formula (Diol-1A) are those wherein ($R_f$) complies with formula ($R_f$-III) as defined above, Y* is H, m* is 1 and n* is 0 or is an integer ranging from 1 to 10; most preferably, n* is 0 or 1.

Preferred diols of formula (Diol-1A) wherein m* is 1 and n* is 0 can be obtained according to known methods, for example as disclosed in EP 1614703 A (SOLVAY SOLEXIS S.P.A.) 11 Jan. 2006.

Preferred diols of formula (Diol-1A) wherein m* is 1 and n* is equal to or higher than 1 can be obtained from (Diol-1A) wherein m* is 1 and n* is 0 by reaction with ethylene oxide or propylene oxide in the presence of a base. In particular, diols (Diol-1A) comprising groups Z and Z' complying with formula (Z-1) in which n* ranges from 1 to 10 can be conveniently manufactured with the method disclosed in WO 2014/090649 A (SOLVAY SPECIALTY POLYMERS ITALY) 19 Jun. 2014.

Diols of formula (Diol-1A) wherein m* is 0 can be prepared following the teaching of WO 2010/057691 (SOLVAY SOLEXIS S.P.A) 27 May 2010, in particular by reaction of:

a carbonyl compound of formula:

$Z^c$—O—$R_f$—C(O)$X^1$, wherein $X^1$ is F and Zc is C(O)$X^1$ or a $C_1$-$C_3$ haloalkyl group, typically selected from —$CF_3$, —$CF_2Cl$, —$CF_2CF_2Cl$, —$C_3F_6Cl$, —$CF_2Br$, —$CF_2CF_3$ and —$CF_2H$, —$CF_2CF_2H$ with a compound of formula:

B—O—$CH_2CHY$—O—B wherein Y is as defined above and B is FC(O)—, R'—SO$_2$— in which is an aromatic group, a hydrogenated or (per)fluorinated C$_1$-C$_{10}$ alkyl, which is straight or branched where possible
in the presence of a source of fluorine anions.

Typically, activated (Diol-1*) comply with formula (Diol-1*A) below

$$E^*\text{-}O\text{—}R'_f\text{-}E^{*'} \tag{Diol-1*A}$$

wherein (R'$_f$) is a fluoropolyoxyalkylene chain as defined above and E* and E*', equal to or different from one another, represent a hydrocarbon group containing one leaving group as defined above, said hydrocarbon group being partially fluorinated and optionally containing one or more ethereal oxygen atoms, or a C$_1$-C$_3$ haloalkyl group, typically selected from —CF$_3$, —CF$_2$Cl, —CF$_2$CF$_2$Cl, —C$_3$F$_6$Cl, —CF$_2$Br, —CF$_2$CF$_3$ and —CF$_2$H, —CF$_2$CF$_2$H.

Preferred activated PFPE diols of formula (Diol-1*) are those wherein (R'$_f$) complies with formula (R$_f$-III) and groups E* and E*' comply with formula (E-2) below:

$$\text{—(CF1}_2)_{m^*}(\text{OCH}_2\text{CHY*})_{n^*}\text{E}^2 \tag{E-2}$$

wherein Y* is H, m* is 0 or 1, n* is 0 or is an integer ranging from 1 to 10 and E$^2$ is selected from a mesylate, nonaflate or tosylate group, with the proviso that, when m* is 0, n* is 1. Most preferably, m* is 1 and n* is 0 or 1.

Activated (Diol-1*) can be obtained from (Diol-1) according to methods known in the art; for example, activated (Diol-1*) comprising perfluoroalkanesulfonate end groups can be prepared following the teaching of TONELLI, Claudio, et al. Linear perfluoropolyethers difunctional oligomers: chemistry, properties and applications. *Journal of Fluorine Chemistry*. 1999, vol. 95, p. 51-70.

In the method of the invention, (Diol-1) can be equal to or different from (Diol-1*), i.e. (Diol-1) may comprise a chain (R$_f$) having the same structure and/or average number molecular weight as chain (R'$_f$) of (Diol-1*) or it may comprise a chain (R$_f$) having different structure and/or average number molecular weight from chain (R'$_f$) of (Diol-1*). In one preferred embodiment, chain (R$_f$) has the same structure and average number molecular weight as chain (R'$_f$); in another preferred embodiment, chain (R f) has the same structure as chain (R'$_f$) and different average number molecular weight. By using (Diol-1) and (Diol-1*) comprising chains (R$_f$) and (R'$_f$) having different structure and/or average number molecular weight, mixtures (M) comprising polymers with different, alternating segments (S$^{RF}$) and (S$^{'RF}$) can be obtained.

If the equivalent ratio (Diol-1)/( Diol-1*) is higher than 1, mixtures (M) in which functional groups (GF) of polymers (P-A) and (P-B) comprise a hydroxy group are obtained, while if the equivalent ratio (Diol-1)/(Diol-1*) is lower than 1, mixtures (M) in which functional groups (G$^F$) of polymers (P-A) and (P-B) comprise a leaving group are obtained. It has also been observed that, the higher the difference between the equivalent amount of (Diol-1) and (Diol*-1), the shorter the length of polymers (P-A) and (P-B). Furthermore, the lower the value [(F-1)+(F-1*)]/2, the higher the amount of monofunctional polymer (P-A) in mixture (M) with respect to difunctional polymer (P-B).

In the method of the invention, a (Diol-1A) and (Diol-1A*) differing from each other in the kind and length of hydrocarbon groups in Z, Z', E* and E*' can also be used; in this case, mixtures (M) comprising polymers in which segment (SH-I) comprise different (R$_h$) and (R$_h$') groups can be obtained. For instance, when a (Diol-1A) comprising groups Z and Z' of formula (Z-1) in which n* is 0 is reacted with an activated (Diol-1A*) in which groups E* and E*' comply with formula (E-2) in which n* is 1, mixtures (M) of polymers comprising segments (S$^H$-1B) can be obtained.

Typically, the method comprises reacting (Diol-1) with an inorganic or organic base in order to obtain (Diol-1) in the salified form [salified (Diol-1)]. Typically, the reaction is carried out in the absence of solvents and the base is used in an equivalent amount ranging from 1 to 1.5 with respect to (Diol-1). The inorganic or organic base will be selected from those skilled in the art in such a way as it does not behave as a nucleophile towards ( Diol-1*). In other words, the base will be selected among those whose corresponding alcohol is less acid than the (Diol-1). Example of such bases are hydroxides, like sodium or calcium hydroxide, tertiary amines like triethylamine (TEA) and alcolates of tertiary alcohols, like potassium tert-butylate.

Salified (Diol-1) is then reacted with (Diol-1*) to provide a mixture (M). Typically, the reaction is carried out by adding a solvent and (Diol-1*) to salified (Diol-1) and by heating at a temperature typically ranging from 80° C. to 130° C. The solvent is typically an aprotic solvent typically selected from dimethylsulfoxide (DMSO), diethylene glycol dimethyl ether (diglyme), triethylene glycol dimethyl ether (triglyme), tetraethylene glycol dimethyl ether (tetraglyme), hexafluoroxylene (HFX) and hexafluorobenzene; according to a preferred embodiment, the solvent is hexafluoroxylene (HFX). The reaction is monitored by taking samples and analysing said samples by $^{19}$F-NMR. If required, additional amounts of base are added in order to maintain suitable reaction kinetics. At the end of the reaction, the reaction mixture is cooled down to room temperature and any excess of (Diol-1) can be removed by vacuum or molecular distillation. Typically, the method allows obtaining mixtures (M) of polymers (P-A)-(P-C) differing not only in their functionality, but also in their average number molecular weight, namely in the number of PFPE segments (S$^{RF}$) and in the number of hydrogenated (poly)ether segments (S$^H$). Preferably, mixtures (M) comprising polymers wherein p is 0 or 1 and q is 1 are obtained, i.e. polymers respectively comprising three PFPE segments and two hydrogenated (poly)ether segments or five PFPE segments and four hydrogenated (poly)ether segments.

Polymers (P-A)-(P-C) having a higher average number molecular weight (M$_n$) can be separated from polymers (P-A)-(P-C) having a lower (M$_n$) by solvent/non-solvent precipitation, then polymers (P-A)-(P-C) having the same (M$_n$) can be separated from one another by absorption/desorption on silica gel following the procedure disclosed in EP 1810987 B (SOLVAY SOLEXIS S.P.A.) 25 Jul. 2007. If any excess of (Diol-1) is not removed by vacuum or molecular distillation at the end of the reaction with (Diol-1*), the solvent/non-solvent precipitation techniques also allows removing such an excess.

Typically, solvent/non-solvent precipitation is carried out by dissolving a mixture of (M) in a non-polar organic solvent, typically selected from Freon® 113 CFC and HFX, in an amount ranging from 50% to 98% by volume with respect to the weight of mixture (M). Preferably, the solvent is Freon® 113 CFC. Thereafter, a polar protic solvent, typically methanol or ethanol, is added to the solution in an amount ranging from 5% to 95% by volume (with respect to the final volume) and the resulting precipitate, comprising polymers (P-A), (P-B) and some (P-C) with a higher (M$_n$), is separated. Any excess of (Diol-1) remains in the solvent phase. The precipitate is submitted to absorption/desorption of silica gel. Preferably, the mixture is added with a non-polar solvent, typically HFX and is added with a solid adsorbing phase, preferably silica gel. The resulting mixture is stirred at room temperature for a time ranging from 2 to 6 hours, then it is filtered, washed with the selected solvent and the liquid phases are pooled together and evaporated in order to obtain non-functional polymers (P-C). The solid phase is then added with the same non-polar solvent as used in the previous absorption/desorption step and a polar protic solvent, typically an alcohol selected from methanol or ethanol, preferably methanol, is added, in such an amount as to reach a volume ratio of non-polar/polar solvent of about 80:20. The mixture is then stirred at room temperature for a time ranging from 2 to 6 hours, then it is filtered, washed with the same solvent mixture and the liquid phases are pooled together and evaporated, thereby obtaining monofunctional and functional polymers (P-A) and (P-B). Polymers (P-A) and (P-B) can be separated according to methods known in the art, for example as disclosed in any one of U.S. Pat. No. 5,246,588 (AUSIMONT S.P.A.) 21 Sep. 1993, U.S. Pat. No. 5,262,057 (AUSIMONT SPA) 16 Nov. 1993, U.S. Pat. No. 5,910,614 (AUSIMONT S.P.A.) 8 Jun. 1999 U.S. Pat. No. 7,288,682 (SOLVAY SOLEXIS SPA) 12 Jan. 2006, which envisage the chromatographic separation on a solid stationary phase and the elution with non-polar and polar solvents. Monofunctional polymers (P-A) have lower affinity towards the active sites of the stationary phase; therefore, when a solution of mono- and bi-functional polymers (P-A) and (P-B) in a non-polar (or scarcely polar) solvent (e.g. Freon® 113 CFC or HFX) is mixed with the stationary phase and equilibrium is reached, most of the bifunctional polymers (P-B) are adsorbed on the silica gel, while monofunctional polymers (P-A) remain in solution and can be separated by filtration and evaporation of the solvent.

The content of monofunctional polymer (P-A) can also be increased by reacting a mixture (M) wherein the polymer ends in polymers (P-A) and (P-A) comprise a leaving group as defined above with a fully or partially halogenated monofunctional alkyl alcohol $R^1OH$, wherein $R^1$ is a (per) haloalkyl chain, preferably a partially fluorinated monofunctional alkyl alcohol, in the presence of an inorganic or organic base. The alcohol is converted in the corresponding alkoxide, which acts as a nucleophile and displaces the leaving group at the ends of polymers (P-A) and (P-B). Preferred fully and partially hydrogenated alkyl alcohols are selected from:

—$CF_3(CF_2)_{a'}CH_2OH$, wherein $a'=0-3$, preferably, $CF_3CH_2OH$;
—$(CF_3)_2CHOH$ and
—$(CF_3)C$—$OH$.

The base is preferably selected from hydroxides, like sodium or calcium hydroxide, tertiary amines like triethylamine (TEA) and alcolates of tertiary alcohols, like potassium tert-butylate.

As an alternative, the content of monofunctional polymer (P-A) can be increased by reacting a (Diol-1) and a fully or partially fluorinated monofunctional alkyl alcohol $R^1OH$ as defined above with (Diol-1*) in the presence of an inorganic or organic base.

The reaction with alcohol $R^1OH$ can be carried out at ambient pressure or under reduced pressure; preferably, the reaction is carried out under reduced pressure, more preferably under a residual pressure ranging from about 66.66 kPa to 13.33 kPa, either in the absence of solvent, or in the presence of an excess of alcohol $R^1OH$ acting as the solvent, or in the presence of an inert fluorinated solvent like HFX, as this allows increasing the yields.

Therefore, a further aspect of the present invention is a method for the manufacture of a mixture (M) as defined above, in particular for the manufacture of a mixture mixture (M) having a higher content of monofunctional polymer (P-A) as defined above, said method comprising:
either reacting mixture (M) as defined above with a fully or partially halogenated monofunctional alkyl alcohol $R^1OH$ as defined above in the presence of an inorganic or organic base;
or reacting a (Diol-1) and a fully or partially halogenated monofunctional alkyl alcohol $R^1OH$ as defined above with (Diol-1*) in the presence of an inorganic or organic base.

The resulting mixture [herein after also referred to as mixture (M')] thus comprises:
bifunctional polymers (P-B) as defined above, wherein the polymer ends comprise hydroxy groups;
monofunctional polymers (P-A) as defined above wherein one polymer end comprises a hydroxy group and the other one comprises a (per)haloalkyl group ($G^{NF}$) corresponding to the (per)haloalkyl chain of alcohol $R^1OH$ [herein after referred to as "monofunctional polymers (P-A')];
optionally, unreacted monofunctional polymers (P-A);
non-functional polymers (P-C) as defined above, wherein each polymer end comprises a (per)haloalkyl group ($G^{NF}$) corresponding to the (per)haloalkyl chain of alcohol $R^1OH$ [herein after referred to as "non-functional polymers (P-C')"]; and
optionally, unreacted non-functional polymers (P-C).

Mixture (M') can be used as such or can be submitted to the separation methods described above in order to separate the polymers therein contained and, in particular, isolate monofunctional polymers (P'-A).

Mixture (M') or polymers monofunctional polymers (P'-A) can also be submitted to the fluorination process described herein below.

Fluorination of Mixtures (M) and of the Polymers Therein Contained

Mixtures (M), in particular those in which polymers (P-A) and (P-B) comprise hydroxy groups at their ends, can be submitted to fluorination in order to provide mixtures [herein after mixtures (M*)] having a higher fluorine content than mixtures (M). In particular, mixtures (M*) contain mono-, bi- and non-functional polymers [herein after also referred to as "polymers (P*-A) (P*-C)"] comprising a plurality of segments ($S^{RF}$) as defined above joined together by (per)fluoropolyether segments ($S^{*F}$), said segments ($S^{*F}$) resulting from complete or partial replacement of the hydrogen atoms in segments ($S^H$) of polymer (P-A)-(P-C) as defined above with fluorine atoms.

Thus, the present invention further relates to mixtures (M*) of mono-, bi- and non-functional polymers obtainable by means of a process which comprises treating a mixture (M) as defined above with a fluorinating agent.

According to a preferred embodiment, the process comprises reacting a mixture (M) comprising polymers (P-A)-(P-C) as defined above wherein one or both ends in polymers (P-A) and (P-B) comprise(s) a hydroxy group with carbonyl fluoride [$C(O)F_2$], in order to convert the hydroxy group into a fluoroformiate [—$OC(O)F$] group. When a mixture (M-I) or (M-II) is used in which ($G^F$) is —$CH_2OH$, the fluroroformiate group complies with formula —$CH_2OC(O)F$. The resulting product [herein after referred to as "mixture (M) fluoroformiate"] is then submitted to fluorination with fluorine in the presence of an inert gas, typically nitrogen, until $^1H$- and $^{19}F$-NMR analyses reveal partial or complete replacement of the hydrogen atoms in segments ($S^H$) and, optionally, in a fluoroformiate group of formula —$CH_2$ OC(O)F, with fluorine atoms. After fluorination, the product [herein after referred to as mixture (M*) fluoroformiate] is reacted with an alcohol $R^2OH$, wherein $R^2$ represents straight or branched alkyl, $C_1$-$C_4$ straight or branched alkyl, more preferably $CH_3$—, in order to convert the fluoroformiate groups into ester groups —$OC(O)R^2$ wherein $R^2$ is as defined above. This product [mixture (M*) ester] is then reacted with a reducing agent, typically a hydride, preferably $NaBH_4$, in order to convert the ester groups into hydroxy groups, thereby obtaining a mixture (M*). Fluorination and esterification of a mixture (M) fluoroformiate with —$CH_2OC(O)F$ leads to the obtainment of a mixture (M*) ester wherein the end groups comply with formula —$CF_2OC(O)F$. After reaction of this mixture with a reducting agent, a mixture (M*) is obtained wherein the polymers comprise —$CH_2OH$ end groups.

Thus, the invention comprises a process for the fluorination of a mixture (M), said process comprising the following steps:

a) reacting a mixture (M) of polymers (P-A)-(P-C) as defined above, wherein one or both ends in polymers (P-A) and (P-B) comprise(s) a hydroxy group, with carbonyl fluoride [$C(O)F_2$], thereby obtaining mixture (M) fluoroformiate;

b) submitting mixture (M) fluoroformiate from step a) to fluorination with fluorine in the presence of an inert gas until partial or complete replacement of the hydrogen atoms of segments ($S^H$) with fluorine atoms, thereby obtaining mixture (M*) fluoroformiate;

c) reacting mixture (M*) fluoroformiate from step b) with an alcohol $R^2OH$, as defined above;

d) reacting mixture (M*) ester from step c) with a reducing agent to provide a mixture (M*) comprising polymers (P*-A)-(P*-C) in which one or both ends of polymers (P*-A) and (P*-B) comprises a hydroxy group and e) optionally, converting the hydroxy groups into leaving groups as defined above according to known methods.

The fluorination method comprising steps a)-e) as defined above is particularly advantageous in that it allows fluorinating hydrogenated (poly)ether segments ($S^H$) without decomposition or loss of the hydroxy groups in the end groups.

Mixtures (M*) obtainable by means of a process comprising steps a)-e) as defined above are a preferred embodiment of the present invention.

Particularly preferred are mixtures (M*-I) of polymers [polymers (P*-IA)-(P*-1C)] obtainable by full or partial fluorination of mixtures (M-I) of polymers (P-IA)-(P-IC) wherein polymers (P-IA)-(PI-B) comprise a hydroxy group in their end group(s). More particularly preferred are mixtures (M*-II) of polymers [polymers (P*-IIA)-(P*-IIC) obtainable by full or partial fluorination of mixtures (M-II) of polymers (P-IIA)-(P-IIC) wherein polymers (P-IIA)-(PII-B) comprise a hydroxy group in their end group(s).

Mixtures (M*-I) and (M*-II) can be submitted to the separation methods described above in respect of mixtures (M) in order to separate polymers (P*-IA)-(P*-IC) or (P*-IIA)-(P*-IIC) having higher $M_n$ from those having lower $M_n$ and in order to separate from one another each of the polymers contained in the mixture.

As an alternative, the above-described fluorination method can be carried out on each of polymers (P-A)-(P-C) separated from mixtures (M). In particular, the fluorination method can be carried out on monofunctional polymers (P-A) wherein chain end comprises a hydroxy group in order to obtain the corresponding monofunctional polymers (P*-A) having a higher fluorination degree.

Therefore, a further aspect of the present invention is represented by a method for the manufacture of a monofunctional fluorinated polymer, said method comprising submitting to complete or partial fluorination a monofunctional polymer (P-A) as defined above.

A further aspect of the invention is represented by fluorinated polymers obtainable by submitting to complete or partial fluorination a monofunctional polymer (P-A) as defined above.

In a further embodiment, the present invention comprises a method for lubricating a surface, said method comprising applying a mixture (M) and/or a mixture (M*) as defined above, optionally in combination with other lubricants, to a surface to be lubricated. According to a preferred embodiment, the method comprises applying a polymer (P-IA) and/or a polymer (P*-IA) as defined above, optionally in combination with other lubricants, to a surface to be lubricated. Compositions comprising a mixture (M) and/or a mixture (M*) as defined above and compositions comprising a polymer (P-IA) and/or a polymer (P*-IA) as defined above and other lubricants are also part of the present invention. Example of further lubricants are PFPE oils, such as those disclosed in EP 2100909 A (SOLVAY SOLEXIS S.P.A.) 16 Sep. 2009 and hydrogen-based oils, including mineral oils of hydrocarbon type, animal or vegetable oils, synthetic oils like polyalphaolefins (PAOs), dibasic acid esters, polyol esters, phosphate esters, polyesters, alkylated naphthalenes, polyphenyl ethers, polybutenes, multiply-alkylated cyclopentanes, silane hydrocarbons, siloxanes and polyalkylene glycols.

In a still further embodiment, the present invention relates to a method for imparting hydro-/oleo-repellence to a substrate, said method comprising applying to a substrate a mixture (M) and/or a mixture (M*), optionally in combination with other surface-treating agents. According to a preferred embodiment, the method comprises applying to a substrate a polymer (P-IA) and/or a polymer (P*-IA) as defined above. Compositions comprising a mixture (M) and/or a mixture (M*) as defined above and compositions comprising a polymer (P-IA) and/or a polymer (P*-IA) as defined above and surface-treating agents are also part of the present invention.

A further aspect of the present invention is represented by the use of mixtures (M) or (M*) as defined above as intermediates (or building blocks) for the manufacture of polymers or block copolymers. Preferably, monofunctional polymers (P-IA) and (P*-IA) as defined above are used as intermediates.

For such purpose, hydroxy groups and leaving groups in mixtures (M) and (M*) as defined above or in monofunctional polymers (P-IB) and (P*-IB) as defined above can be converted into other functional groups according to methods known in the art; example of functional groups include carboxy, acyl, urethane, (meth)acrylate, (alkyl)amino, amido, alkoxy, optionally substituted (hetero)aryloxy, polyhydroxyalkoxy, alkylthio, alkylsulfonate, alkylsulfoxide and alkylsulfone. Examples of optionally substituted (hetero)aryloxy include phenoxy, (poly)nitrophenoxy and pyridyloxy. Salts of mixtures (M) and (M*) as defined above or of polymers (P-IA) and (P*-IA) can also be prepared.

In particular, mixtures (M) and (M*) as defined above or polymers (P-IA) and (P*-IA) as defined above in which the polymer end groups comprise hydroxy groups can be reacted with compounds able to undergo nucleophile attack, while mixtures (M) and (M*) as defined above or polymers (P-IA) and (P*-IA) as defined above in which the polymer end groups comprise leaving groups, in particular sulfonate groups, can be reacted with nucleophilic compounds.

Examples of block-copolymers that can be manufactured using mixtures (M) and/or (M*) as defined above or polymers (P-IA) and/or (P*-IA) as defined above as building blocks include polyesters, polyamides, polyacrylates and polyurethanes.

Polyesters can be prepared according to known methods from mixtures (M) and/or (M*) as defined above or polymers (P-IA) and/or (P*-IA) as defined above in which the polymer ends comprise a hydroxy group by reaction with a polycarboxylic acid, preferably a dicarboxylic acid, according to methods known in the art. Polyesters can also be prepared by converting mixtures (M) and/or (M*) as defined above or polymers (P-IA) and/or (P*-IA) as defined above in which the polymer ends comprise a hydroxy group into corresponding mixtures or polymers in which the polymer end groups comprises a carboxy or a carboxy-containing group or an ester or ester-containing group as defined above (this conversion can be accomplished, e.g., by reaction with a malonic ester) with a polyalcohol, typically a diol, according to methods known in the art.

Polyamides can be prepared by replacing the hydroxy or leaving groups in mixtures (M) and/or (M*) as defined above or polymers (P-IA) and/or (P*-IA) with an ester or ester-containing group (this conversion can be accomplished, e.g., by reaction with a malonic ester) and by reacting the resulting mixtures or polymers with a polyamine, typically a diamine, according to methods known in the art. Examples of preferred amines are hexamethylenediamine, diethylenediamine and ethylenediamine.

Polyacrylates can be prepared by replacing the hydroxy or leaving group in mixtures (M) and/or (M*) as defined above or polymers (P-IA) and/or (P*-IA) with an acryl or (meth)acryl group according to known methods and by submitting the resulting polymer to radical polymerization with an acrylic or (meth)acrylic acid derivative in the presence or a radical initiator, according to known methods.

Polyurethanes can be prepared by reacting a mixture (M) and/or (M*) as defined above or a polymer (P-IA) and/or (P*-IA) as defined above in which the polymer ends comprise a hydroxy group with a polyol, e.g. glycidol, a diisocyanate or a polyisocyanate, optionally in the presence of a chain extender selected from a diol or a diamine or a mixture thereof, according to methods known in the art.

Accordingly, the present invention comprises methods for the manufacture of polymers or block-polymers comprising using a mixture (M) and/or (M*) as defined above or a polymer (P-IA) and/or (P*-IA) as defined above as intermediates or building blocks.

The invention will be herein after illustrated in greater detail in the following Experimental Section by means of non-limiting Examples.

Should the disclosure of any patents, patent applications, and publications which are incorporated herein by reference conflict with the description of the present application to the extent that it may render a term unclear, the present description shall take precedence.

EXPERIMENTAL SECTION

Materials and Methods
Materials

The following Fomblin® Z DOL (per)fluoropolyethers, complying with general formula:

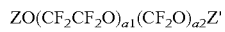

in which Z and Z', equal to or different from one another, represent —$CF_2CH_2OH$ or a non-functional groups selected from $CF_3O$— and $CF_2H$— were used as (Diol-1) and for the preparation of activated diols (Diol-1*) in the Examples:

Fomblin® Z DOL PFPE wherein a1 and a2 are selected in such a way as (Mn)=1039 and EW=520, average functionality F=2.00 [herein after also "Fomblin® Z DOL PFPE (1)];

Fomblin® Z DOL PFPE wherein a1 and a2 are selected in such a way as (Mn)=1070 and EW 565; average functionality F=1.89 [herein after also "Fomblin® Z DOL PFPE (2)];

Fomblin Z DOL PFPE wherein a1 and a2 are selected in such a way as (Mn)=1100 and EW=730; average functionality F=1.50 [herein after also "Fomblin® Z DOL PFPE (3)].

The compounds are available from Solvay Specialty Polymers Italy S.p.A. and were prepared according to known methods.

Methods $^1$H-NMR analyses were performed on a Varian Mercury 300 MHz spectrometer employing tetramethylsilane (TMS) as internal standard.

$^{19}$F-NMR analyses were performed on a Varian Mercury 300 MHz spectrometer employing $CFCl_3$ as internal standard.

The formation of Fomblin® Z DOL nonaflates was confirmed by $^{19}$F-NMR analysis. Typical diagnostic $^{19}$F-NMR signals of Fomblin® Z DOL nonaflates resonate at −110 ppm ($C_3F_7$—CF2—$SO_2$), while the diagnostic signal of any perfluorobutansulfonate resulting from hydrolysis of the nonaflate resonates at −114 ppm. The signals of the $CF_2$ group in the —$OCF_2CH_2$—O—$SO_2$— moiety resonate at −78 and −80 ppm, while the signals of the $CF_2$ in the —$OCF2CH_2OH$ moiety of the starting Fomblin® Z DOL PFPE (which resonate at −81 and −83 ppm) disappear once conversion is complete.

The formation of mixtures (M) was confirmed by the typical $^{19}$F-NMR diagnostic signals of difunctional polymers (P-A), i.e.:

—$CF_2$ preterminal groups linked to the methylol terminal groups, which resonate at −81 ppm and −83 ppm;

—$CF_2$ preterminal groups linked to the internal —$CH_2OCH_2$— sequences, which resonate at −81 ppm and −79 ppm.

EXAMPLES

Example 1 Synthesis and Purification of a Polymer Mixture Obtained from Fomblin® Z DOL PFPE with the Same Average Functionality (1.89) and Different Mn Step 1—Synthesis of Fomblin® Z DOL PFPE Nonaflate A glass reactor was charged with triethylamine (TEA) (4.95 g, 49 meq) and perfluoro-1-butanesulfonyl fluoride (12.3 g, 40.8 meq) and the resulting mixture was kept under mechanical stirring. The internal temperature of the reaction mass was lowered to −5/+5° C. using a dry ice bath. Fomblin® Z DOL PFPE (1) (20 g, 19 mmoles, 38 meq) was added drop-wise under vigorous stirring. After that, the reaction mixture was warmed up to room temperature, under mechanical stirring. The reaction was monitored by $^{19}$F-NMR. After 2 hours at room temperature a sample was taken for $^{19}$F-NMR analysis (conversion 70%). The internal temperature was increased to 70° C. until completion of the reaction. After complete conversion, the reaction mixture was cooled to room temperature and washed twice with ethanol (20 g per washing). An organic bottom phase formed; this phase was separated and the solvent was stripped at 70° C. under vacuum. Fomblin® Z DOL PFPE nonaflate ((Mn)=1630 EW=820) was isolated with a purity >95% and a yield >90%.

Step 2—Reaction of Fomblin® Z DOL PFPE with Fomblin® Z DOL PFPE Nonaflate of Step 1 (Molar Ratio 3:1)

A glass reactor was charged with Fomblin® Z DOL PFPE (2) (61 g, 58 mmoles, 108 meq). The internal temperature of the resulting mixture was lowered to 10° C. using an ice bath. Anhydrous potassium tert-butoxide (4.8 g, 42 meq) was added using a tailed tube, under mechanical stirring. Thereafter, the mixture was warmed up to room temperature, under mechanical stirring, and subsequently heated to 40° C. for 3 hours and then at 80° C. under vacuum for 3 further hours, in order to remove the tert-butanol formed in the course of the reaction.

Hexafluoroxylene (HFX; 30 ml; 30% w/w vs. the formed Fomblin ®Z DOL PFPE potassium salt) was then added and the Fomblin® Z DOL PFPE nonaflate prepared in Step 1 (30.8 g, 19 mmoles, 38 meq) was added drop-wise under vigorous stirring in 4 hours. The resulting mixture was heated at 120° C. for 20 hrs. The progress of the reaction was followed by $^{19}$F-NMR and typically one addition of 10% by moles vs. the original amount of potassium tert-butoxide every 5 hours reaction time was necessary to maintain reasonable reaction kinetics. After complete conversion, the product was diluted with HFX/Ethanol and was washed with aqueous HCl 10% w/w. The bottom organic phase was separated and washed again with water. Complete phase separation was carried out by centrifugation (3500 rpm, 20 min) and any residual solvents were distilled at 70° C. under vacuum.

The resulting clear product was filtered on a 0.2 μm PTFE+glass prefilter.

A sample was taken and submitted to vacuum distillation at 170° C. in order to remove the excess of Fomblin® Z DOL PFPE, then analysed by $^1$H- and $^{19}$F-NMR. The analyses confirmed the obtainment of a mixture comprising the following polymers complying with formulae (PII-A)-(P-IIC) as defined above, wherein:

($G^{NF}$) represents $CF_3O$— or $CF_2H$—;
($G^F$) represents —$CF_2CH_2OH$;
($S^{RF}$) and ($S'^{RF}$) and represent chains of formula: $CF_2O(CF_2CF_2O)_{a1}(CF_2O)_{a2}CF_2$ in which a1 and a2 are as defined in Fomblin® Z DOL PFPE (2) and (1) respectively;
($R_h$)=($R_{h'}$)=$CH_2$ and
p=0.1 (average value).

Step 3—Fractionation of the Mixture Obtained in Step 2

The whole reaction mixture obtained from Step 2 was thus purified from the excess of Fomblin® Z DOL PFPE by vacuum distillation. The distillation residue (55 g) was dissolved in Freon® 113 CFC (10% w/vol) and added with 5% (w/vol) methanol. A precipitate was obtained consisting of 9 g of polymers of formulae (P-IIA)-(P-IIC) as defined in Step 2, wherein p=1.

The solvents separated from the precipitate were evaporated and the residue, consisting of a mixture of polymers of formulae (P-IIA)-(P-IIC) as defined in Step 2, wherein p=0 was submitted to a separation process by absorption/desorption on silica gel following the teaching of EP 1810987, in order to separate the non-functional polymers from mono- and difunctional polymers.

In greater detail, 45 g of such mixture were dissolved in 900 ml of HFX and added with 150 g of silica gel. The resulting suspension was stirred at room temperature for 1 h, filtered and the filtrate was kept aside. The solid phase was washed with 200 ml HFX, and the resulting liquid phase was combined with the filtrate. Thereafter, the solvent was removed by gentle distillation under reduced pressure at 70° C. 0.8 g of a residue was obtained. $^{19}$F- and $^1$H-NMR analyses revealed that its structure corresponded to a non-functional polymer of formula (P-IIC) as defined above wherein p=0.

Then the solid phase was charged in a reactor with 1 L solution of HFX/methanol (98/2 w/w) and stirred for 1 h at room temperature. The resulting suspension was filtered and the filtrate was kept aside. The solid phase was washed with 200 ml HFX/methanol 98/2 w/w and the liquid phase thereby obtained was combined with the filtrate, then the solvents were removed by gentle distillation at 50° C. under atmospheric pressure, then at 70° C. under reduced pressure, to obtain 7.7 g of a residue. $^{19}$F- and $^1$H-NMR analyses revealed that the residue was polymer (P-IIA) wherein p=0.

A further addition of 1 L HFX/methanol (80/20) allowed the isolation of 34.9 g polymer (P-IIB), after solvent removal. The molar ratio (P-IIA)/(P-IIB) was 4.5.

The following fractions of polymers (P-IIA)-(P-IIC) were thus obtained (percentages on a molar basis):
mixture of polymers of formulae (P-IIA)-(P-IIC) with p=1:10%
bifunctional polymer of formula (P-IIB) with p=0:73%
monofunctional polymer of formula (P-IIA) with p=0: 16%
non-functional polymer of formula (P-IIC) with p=0:1%
Overall yield (with respect to nonaflate): 95%.

Example 2—Synthesis and Purification of a Polymer Mixture Obtained from Fomblin® Z DOL PFPE with Different Functionalities and Different Molecular Weights Step 1—Synthesis of Fomblin® Z DOL PFPE Nonaflate
Example 1, step 1 was repeated.
Step 2—Reaction of Fomblin® Z DOL PFPE with Fomblin® Z DOL PFPE Nonaflate of Step 1 (molar ratio 3:1)
The procedure described in Example 1, step 2 was repeated with the following differences:
Fomblin® Z DOL PFPE (3): 70 g, 64 mmol, 96 meq;
anhydrous potassium tert-butoxide: 5.5 g, 48 meq;
Fomblin® Z DOL PFPE nonaflate of Step 1:22 g, 21 mmol, 42 meq;
reaction time after completion of the addition of Fomblin® Z DOL PFPE nonaflate: 24 hours;
solvents added to the reaction mixture after completion of the reaction: HFE 7200/ethanol 80:20 (vol:vol), 30 ml;
After filtration, a sample was taken and submitted to vacuum distillation at 170° C. in order to remove the excess of Fomblin® Z DOL PFPE, then analysed by $^1$H- and $^{19}$F-NMR. The analyses confirmed the obtainment of a mixture comprising polymers of formulae (P-IIA)-(P-IIC) as defined above, wherein:

($G^{NF}$), ($G^F$), ($R_h$), ($R_{h'}$) and p are as defined in Example 1, Step 2 and
($S^{RF}$) and ($S'^{RF}$) represent chains of formula: $CF_2O(CF_2CF_2O)_{a1}(CF_2O)_{a2}CF2$ in which in chain ($S^{RF}$) a1 and a2 are as defined in the Fomblin® Z DOL PFPE (3) and in chains ($S'^{RF}$) are as defined in Fomblin® Z DOL PFPE (1).

Step 3—Fractionation of the Mixture Obtained in Step 2

The whole reaction mixture obtained from Step 2 was purified from the excess of Fomblin® Z DOL PFPE by vacuum distillation. The distillation residue (64 g) was dissolved in Freon® 113 CFC (10% w/vol) and added with 5% (w/vol) methanol. A precipitate was obtained consisting of 11 g of polymers of formulae (P-IIA)-(PII-C) as defined in Example 2, Step 2, wherein p=1.

The solvents separated from the precipitate were evaporated and the residue, consisting of a mixture of polymers of formulae (P-IIA)-(PII-C) as defined in Example 2, Step 2, wherein p=0 was submitted to a separation process by absorption/desorption on silica gel following the procedure disclosed in Example 1, Step 3.

The following fractions of polymers (P-IIA)-(P-IIC) were thus obtained (percentages on a molar basis):
mixture of polymers of formulae (P-IIA)-(P-IIC) with p=1:9%
bifunctional polymer of formula (P-IIB) with p=0:22%
mono-functional polymer of formula (P-IIA) with p=0: 45%
non-functional polymer of formula (P-IIC) with p=0:24%
Overall yield (with respect to nonaflate): 96%.

Example 3—Synthesis and Purification of a Polymer Mixture Obtained from Fomblin ® Z DOL PFPE with Different Functionalities and Different Mn Step 1—Synthesis of Fomblin® Z DOL PFPE Nonaflate
Example 1, step 1 was repeated.
Step 2—Reaction of Fomblin® Z DOL PFPE with Fomblin® Z DOL PFPE Nonaflate of Step 1 (Molar Ratio 2:1)
The procedure described in Example 1, step 2 was repeated with the following differences:
Fomblin® Z DOL PFPE (3): 60 g, 55 mmol, 82 meq;
anhydrous potassium tent-butoxide: 7.1 g, 62 meq;
Fomblin® Z DOL PFPE nonaflate of Step 1: 44 g, 27.5 mmol, 55 meq.

After filtration, a sample was taken and submitted to vacuum distillation at 170° C. in order to remove the excess of Fomblin® Z DOL PFPE, then analysed by $^1$H- and $^{19}$F-NMR. The analyses confirmed the obtainment of of a mixture comprising polymers of formulae (P-IIA)-(P-IIC) as defined above, wherein:
($G^{NF}$), ($G^F$), ($R_h$) and ($R_{h'}$) are as defined in Example 1, Step 2 and
($S'^{RF}$) and ($S''^{RF}$) represent chains of formula: $CF_2O(CF_2CF_2O)_{a1}(CF_2O)_{a2}CF_2$ in which in chain ($S'^{RF}$) a1 and a2 are as defined in the Fomblin® Z DOL PFPE (3) and in chains ($S''^{RF}$) are as defined in Fomblin® Z DOL PFPE (1) and
p=0.5 (average value).
Step 3—Fractionation of the Mixture Obtained in Step 2

The whole reaction mixture obtained from Step 2 was purified from the excess of Fomblin® Z DOL PFPE by vacuum distillation. The distillation residue (80 g) was dissolved in Freon® 113 CFC (10% w/vol) and added with 5% (w/vol) methanol. A precipitate was obtained consisting of 24 g of polymers (P-IIA)-(P-IIC) as defined in Example 3, Step 2 wherein p=1.

The solvents separated from the precipitate were evaporated and the residue, consisting of a mixture of polymers (P-IIA)-(P-IIC) as defined in Example 3, Step 2 wherein p=0 was submitted to a separation process by absorption/desorption on silica gel following the procedure disclosed in Example 1, Step 3.

The following fractions of polymers (P-IIA)-(P-IIC) were thus obtained (percentages on a molar basis):
mixture of polymers of formulae (P-IIA)-(P-IIC) with p=1:32%
bifunctional polymer of formula (P-IIB) with p=0:16%
monofunctional polymer of formula (P-IIA) with p=0: 35%
non-functional polymer of formula (P-IIC) with p=0:17%
Overall yield (with respect to nonaflate: 97%.

Example 4—Synthesis and Purification of a Polymer Mixture Obtained from Fomblin® Z DOL PFPE with Different Functionalities and Different Mn Step 1—Synthesis of Fomblin® Z DOL PFPE Nonaflate
Example 1, step 1 was repeated.
Step 2—Reaction of Fomblin® Z DOL PFPE with Fomblin® Z DOL PFPE Nonaflate of Step 1 (Molar Ratio 4:1)
The procedure described in Example 1, step 2 was repeated with the following differences:
Fomblin® Z DOL PFPE (3): 80 g, 73 mmol, 110 meq;
anhydrous potassium tent-butoxide: 5.2 g, 45 meq;
Fomblin® Z DOL PFPE nonaflate of Step 1: 28.8 g, 18 mmol, 36 meq.

After filtration, a sample was taken and submitted to vacuum distillation at 170° C. in order to remove the excess of Fomblin® Z DOL PFPE (3), then analysed by $^1$H- and $^{19}$F-NMR. The analyses confirmed the obtainment of the following a mixture comprising polymers of formulae (P-IIA)-(P-IIC) as defined above, wherein:
($G^{NF}$), ($G^F$), ($R_h$) and ($R_{h'}$) are as defined in Example 1, Step 2 and
(S'RF) and (S''RF) represent chains of formula: $CF_2O(CF_2CF_2O)_{a1}(CF_2O)_{a2}CF_2$ in which in chain ($S^{RF}$) a1 and a2 are as defined in Fomblin® Z DOL PFPE (3) and in chains ($S''^{RF}$) are as defined in in Fomblin® Z DOL PFPE (1) and
p=0.5 (average value)
Step 3—Fractionation of the Mixture Obtained in Step 2

The whole reaction mixture obtained from Step 2 was purified from the excess of Fomblin® Z DOL PFPE by vacuum distillation. The distillation residue (57 g) was dissolved in Freon® 113 CFC (10% w/vol) and added with 5% (w/vol) methanol. A precipitate was obtained consisting of 2 g of polymers of formulae (P-IIA)-(P-IIC) as defined in Example 4, Step 2, wherein p=1.

The solvents separated from the precipitate were evaporated and the residue, consisting of a mixture of polymers of formulae (P-IIA)-(P-IIC) wherein p=0 was submitted to a separation process by absorption/desorption on silica gel following the procedure disclosed in Example 1, Step 3.

The following fractions of polymers (P-IIA)-(P-IIC) were thus obtained (percentages on a molar basis):
mixture of polymers of formulae (P-IIA)-(P-IIC) with p=1:2%
bifunctional polymer of formula (P-IIB) with p=0:24%
monofunctional polymer of formula (P-IIA) with p=0: 48.9%
non-functional polymer of formula (P-IIC) with p=0: 25.1%
Overall yield with respect to nonaflate: 97%.

Example 5—Synthesis and Purification of a Polymer Mixture Obtained from Fomblin® Z DOL PFPE with Different Functionalities and Different Mn Step 1 Synthesis of Fomblin® Z DOL PFPE Nonaflate
Example 1, step 1 was repeated.
Step 2—Reaction of Fomblin® Z DOL PFPE with Fomblin® Z DOL PFPE Nonaflate of Step 1 (Molar Ratio 1:4.2)
The procedure described in Example 1, step 2 was repeated with the following differences:
Fomblin ®Z DOL PFPE (1): 10 g, 9.6 mmol, 19 meq;
anhydrous potassium tert-butoxide: 2.5 g, 22 meq;
Fomblin® Z DOL PFPE nonaflate of Step 1: 65 g, 40 mmol, 79.3 meq.
The reaction product (29 g) was isolated according to the procedure disclosed in Example 1, Step 2.
$^1$H- and $^{19}$F-NMR analyses confirmed the obtainment of mixtures of polymers of formulae (P-IIA)-(P-IIC) as defined above, wherein:
($G^{NF}$), ($R_h$) and ($R_{h'}$) are as defined in Example 1, Step 2;
(GF) is perfluorobutanesulfonyl;
($S'^{RF}$) and ($S''^{RF}$) represent chains of formula: OF$_2$O (CF$_2$CF$_2$O)$_{a1}$(CF$_2$ O)$_{a2}$CF$_2$ in which in chain ($S'^{RF}$) a1 and a2 are as defined in the Fomblin® Z DOL PFPE (1) and in chains (S"RF) are as defined in Fomblin® Z DOL PFPE and
p=0.1 (average value)
Step 3—Fractionation of the Mixture Obtained in Step 2
The product of Step 2 was dissolved in Freon® 113 CFC (10% w/vol) and added with 5% (w/vol) ethanol. A precipitate was obtained consisting of 1.8 g of a mixture of polymers with the formulae (P-IIA)-(P-IIC) as defined in Example 5, Step 5 wherein p=1.
The solvents separated from the precipitate were evaporated and the residue consisted of a mixture of polymers (P-IIA)-(P-IIC) as defined in Example 5, Step 2, wherein p=0. This mixture was characterized by an average number molecular weight of 3700 and average EW=2780, corresponding to an average functionality 1.33.

Example 6 Reaction of the Mixture of Polymers (P-IIA) and (PIIB) of Example 5 with Pyridine A glass reactor was charged with 20 g of the mixture of polymers (P-IIA)-(P-IIC) obtained in Example 5 (7.4 mmoles, 9.8 meq of nonaflate groups), an excess of about 2 times of pyridine was added (2.1 g, 20 meq) and the reaction mass was stirred at 70° C. for 2 hr. Thereafter, the excess of pyridine was removed by distillation under reduced pressure. The final product was characterized by $^{19}$F- and $^1$H-NMR, which confirmed the expected following structures:

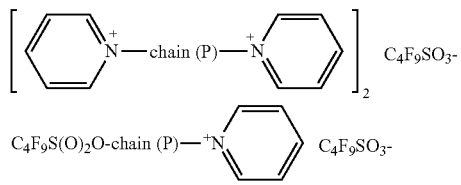

in which chain (P) represents a chain of formula:

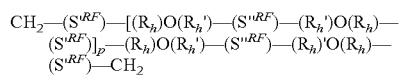

wherein (S'RF), (S"RF) ($R_h$) and ($R_{h'}$) are as defined in Example 5.
The nonaflate anion can be substituted with other anions by conventional metathesis reaction.

Example 7 Synthesis a Polymer Mixture from Fomblin® Z DOL PFPE with Different Functionalities and Mn Reaction with Trifluorethanol and Purification Step 1—Synthesis of Fomblin® Z DOL PFPE Nonaflate
Example 1, step 1 was repeated.
Step 2—Reaction of Fomblin® Z DOL PFPE with Fomblin® Z DOL PFPE Nonaflate of Step 1 (Molar Ratio 3:1)
The procedure described in Example 1, step 2 was repeated with the following differences:
Fomblin®Z DOL PFPE (2): 61 g, 57 mmol, 108 meq;
anhydrous potassium tert-butoxide: 2.2 g, 19 meq;
Fomblin®Z DOL PFPE nonaflate of Step 1:31 g, 19 mmol, 38 meq.
No further additions of potassium tert-butoxide were made in the course of the reaction.
The progress of the reaction was followed by $^{19}$H-NMR; after 20 hours, a 50% conversion of the perfluorobutane-sulfonyl groups was achieved.
Step 3—Reaction of the Polymer Mixture from Step 2 with Trifluoroethanol
The reaction mixture obtained from Step 2 was cooled down to 70° C. and anhydrous CF$_3$CH$_2$OH (6 g, 60 meq) was added. The resulting mixture was stirred vigorously and anhydrous t-BuOK (2.7 g, 22 mmol) was slowly added by means of a tailed tube. After completing the addition, a heterogeneous mixture was obtained, which was left under stirring for 1 hr. The reaction temperature was then raised to 75° C. The progress of the reaction was followed by monitoring the amount of mmoles of generated C$_4$F$_9$SO$_3$K by quantitative $^{19}$F-NMR analyses of the upper layer. Once the reaction was complete, the reaction mass was cooled down to room temperature and the product was washed twice with ethanol (20 g for each washing). The organic phase was separated and all solvents were stripped at 70° C. under vacuum. The resulting product was purified from unreacted Fomblin® Z DOL PFPE by vacuum distillation.
$^1$H- and $^{19}$F-NMR analyses confirmed the obtainment of a mixture comprising (P-IIA), (P'''-IIA), (P-B), (P-IIC) and (P'''-IIC) as defined above, wherein:
($G^{NF}$)=CF$_3$CH$_2$O—, CF$_3$O— and CF$_2$HO—
($G^F$)=—CF$_2$CH$_2$OH;
($R_h$)=($R_{h'}$) =CH$_2$;
($S'^{RF}$) and ($S''^{RF}$) represent chains of formula: CF$_2$O (CF$_2$CF$_2$O)$_{a1}$(CF$_2$O)$_{a2}$CF$_2$ in which in chain ($S'^{RF}$) a1 and a2 are as defined in Fomblin® Z DOL PFPE (2) and in chains ($S''^{RF}$) as defined in Fomblin® Z DOL PFPE (1) and
p=0
Step 4 Fractionation of the Mixture Obtained in Step 3
The mixture obtained from Step 3 (40 g) was submitted to a separation process by absorption/desorption on silica gel following the procedure disclosed in Example 1, Step 3, to obtain three fractions: 1) 8 g of non-functional polymer of formula (P-IIC) as defined in Example 7, Step 3; 2) 20 g of monofunctional polymer (P-IIA) and 10 g of bifunctional polymer (P-IIB) as defined in Example 7, Step 3.

Thus, the following molar yield of polymers was obtained:
bifunctional polymer (P-IIB) (p=0): 26%
mono-functional polymer (P-IIA) (p=0): 53% (Mn 3300, EW 3300)
non-functional polymer (P-IIC) (p=0): 21%
Overall yield: 98% wt with respect to the mixture submitted to fractionation.

Example 8 Fluorination of Mono-Functional Polymer Obtained from Example 7

Step 4

Mono-functional polymer (P-IIA) was separated from bifunctional polymer (P-IIB) following the procedure disclosed in EP 1810987. Thereafter, 5 g (1.52 mmol hydroxy groups) of monofunctional polymer (P-IIA) (MW=EW=3290 g/mol) was dissolved in 30 ml of Freon® 113 CFC, loaded into a stainless steel reactor and cooled to −78° C. The resulting mixture was stirred at 1000 rpm and $COF_2$ (0.6 g, 9.1 mmol) was condensed into the stainless steel reactor which was slowly brought to 20° C. The progress of the reaction was followed by monitoring the internal pressure of the reactor. Once the pressure indicated complete conversion, the reactor was purged in order to remove unreacted $COF_2$. The reactor was then heated to 50° C. under vacuum in order to distil Freon® 113 CFC away. Quantitative $^{19}$F-NMR analysis demonstrated that conversion=selectivity=yield=99% by evaluating the typical fluoroformate —OCO$\underline{F}$ signal at −18 ppm (1.52 meq OCOF). The product was then placed into a stainless steel reactor, diluted with 40 g of Freon® 113 CFC and fluorinated with a 10% (w/w) $F_2/N_2$ gas mixture at −5° C. and 1 N*L/h for a total of 1.7 hours (76 mmol $F_2$, i.e. 5 times the stoichiometric amount required for replacement of all hydrogen atoms with fluorine atoms; fluorination efficiency of 20 mol %). $^1$H and $^{19}$F-NMR indicated complete conversion and a yield 95%. The resulting fluoroformate ester, complying with formula:

$CF_3CF_2O—(S'^{RF})—(R_{fh})O(R_{fh}')—(S''^{RF})—(R_{fh}')O(R_{fh})—(S'^{RF})—CF_2OC(O)F$ in which $(S'^{RF})$ and $(S''^{RF})$ are as defined above and $(R_{fh})$ and $(R_{fh}')$ represent segments $(R_f)$ and $(R_f')$ wherein all hydrogen atoms have been replaced by fluorine atoms.
was stripped at 40° C. under vacuum to eliminate all Freon® 113 CFC, placed in a glass reactor and cooled to 0° C. $CH_3OH$ (48.75 mmol, 1.56 g, 32 times the stoichiometric requirement) was added to this ester with a micro-dripping funnel. The reaction was exothermic (10° C. exothermicity observed) and was immediate. At the end of the reaction a biphasic crude mixture was obtained (ester of polymer at the bottom and unreacted $CH_3OH$, HF and $(CH_3O)_2C(=O)$ on top). Freon® 113 CFC was added and the crude mixture was extracted twice with distilled $H_2O$. The lower phase was dried over $MgSO_4$, filtered and the solvent was evaporated. Isolated yield=80 mol % of monomethyl ester of formula:

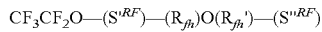

in which $(S'^{RF})$, $(S''^{RF})$, $(R_{fh})$ and $(R_{fh}')$ are as defined above
This monomethyl ester (4.9 g, 1.49 meq) was reduced by dripping it in a non-homogeneous solution of 20 ml of anhydrous $C_2H_5OH$ and $NaBH_4$ (0.24 g, 6.35 mmol), heating at 35° C. for 3 h. Once conversion was complete (following the boronic ester formation by $^{19}$F-NMR of the preterminals) the crude mixture was hydrolyzed by adding $H_2O$ and stirring at 70° for 1 h. The crude mixture was extracted in HFX (50 ml), dried over $MgSO_4$, filtered and the solvent was evaporated under vacuum at 50° C.
Isolated yield=3.68 g, 73 mol % vs starting ester, selectivity=100% of $CF_3CF_2O—(S'^{RF})—(R_{fh})O(R_{fh}')—(S''^{RF})—(R_{fh}')O(R_{fh})—(S'^{RF})—CH_2OC(O)CH_3$ in which (SRF), $(S''^{RF})$ $(R_{fh})$ and $(R_{fh}')$ are as defined above $(M_n)$=3400 g/mole, EW=ca. 3400 g/eq).

The invention claimed is:
1. A mixture of polymers, said mixture containing:
monofunctional polymers (P-A) and bifunctional polymers (P—B) each independently comprising a plurality of (per)fluoropolyether segments $(S^{RF})$ joined together by hydrogenated (poly)ether segments $(S^H)$, said polymers having two ends, wherein one or both ends comprises a hydroxy or a sulfonate group;
a non-functional polymer (P—C) comprising a plurality of (per)fluoropolyether segments $(S^{RF})$ joined together by hydrogenated (poly)ether segments $(S^H)$, with the proviso that the hydrogenated (poly)ether segments $(S^H)$ are not segments of formula —$CH_2OCH_2OCH_2$—;
wherein segments $(S^H)$ comply with formula $(S^H$—I):

$$—R_h—O—R_h'— \quad (S^H—I)$$

wherein $(R_h)$ and $(R_h')$, equal to or different from one another, are selected from straight or branched divalent alkylene segments, each comprising at least one carbon atom; when $(R_h)$ and $(R_h')$ comprise more than one carbon atom, they can optionally be interrupted by one or more ethereal oxygen atoms.
2. The mixture according to claim 1 wherein polymers (P-A)-(P—C) comprise at least two (per)fluoropolyether segments $(S^{RF})$.
3. The mixture according to claim 2, wherein polymers (P-A)-(P—C) comprise at least three (per)fluoropolyether segments $(S^{RF})$.
4. The mixture according to claim 1, wherein the monofunctional polymer (P-A), bifunctional polymer (P—B) and non-functional polymer (P—C) each independently comply with formula (M-I):

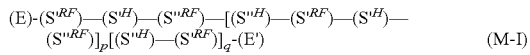

wherein:
$(S'^{RF})$ and $(S''^{RF})$, equal to or different from one another, are (per)fluoropolyether segments $(S^{RF})$;
$(S'^H)$ and $(S''^H)$, equal to or different from one another, are hydrogenated (poly)ether segments $(S^H)$;
(E) and (E'), equal to or different from one another, represent a group comprising a hydroxy group, a sulfonate group or a (per)haloalkyl group;
p is 0 or a positive number and
q is 0 or 1.
5. The mixture according to claim 4, wherein segments $(S'^{RF})$ and $(S''^{RF})$ each independently comprise a fully or partially fluorinated polyoxyalkylene chain $(R_f)$ having a number average molecular weight ranging from 400 to 5,000 and comprising repeating units ($R°$) selected from:
(i) —CFXO—, wherein X is F or $CF_3$,
(ii) —CFXCFXO—, wherein X, equal or different at each occurrence, is F or $CF_3$, with the proviso that at least one of X is —F,
(iii) —$CF_2CF_2CW_2O$—, wherein each of W, equal or different from each other, are F, Cl, or H,
(iv) —$CF_2CF_2CF_2CF_2O$—,
(v) —$(CF_2)_j$—CFZ*—0—wherein j is an integer from 0 to 3 and Z* is a group of general formula —$OR_f$*T, wherein $R_f^*$ is a fluoropolyoxyalkene chain comprising a number of repeating units from 0 to 10, said recurring units being selected from: —CFXO—, —CF$_2$CFXO—, —CF$_2$CF$_2$CF$_2$O—, —CF$_2$CF$_2$CF$_2$CF$_2$O—, with each X being independently F or CF$_3$ and T being a C$_1$-C$_3$ perfluoroalkyl group.

6. The mixture according to claim 4, wherein segments ($S^H$) and ($S''^H$) comply with formula ($S^H$—I):

wherein ($R_h$) and ($R_h'$), equal to or different from one another, are selected from straight or branched divalent alkylene segments, each comprising at least one carbon atom; when ($R_h$) and ($R_h'$) comprise more than one carbon atom, they can optionally be interrupted by one or more ethereal oxygen atoms.

7. The mixture according to claim 6 wherein ($R_h$) complies with formula ($R_h$—I):

—(CH$_2$)$_m$(OCH$_2$CHY)$_n$—          ($R_h$—I)

wherein m is 0 or 1, n is 0 or an integer equal to or higher than 1 and Y is hydrogen or methyl, with the proviso that, when m is 0, n is at least 1; and ($R_h'$) complies with formula($R_h'$—I):

—(CHY'CH$_2$O)$_{n'}$(CH$_2$)$_{m'}$—          ($R_h'$—I)

wherein Y' is hydrogen or methyl, n' is 0 or an integer equal to or higher than 1 and m' is 0 or 1, with the proviso that, when m' is 0, n' is at least 1.

8. The mixture according to claim 4, wherein end groups (E) and (E') are each independently selected from:
   a functional group ($G^F$) which is a straight or branched alkyl group comprising at least one carbon atom, optionally interrupted by ethereal oxygen atoms, said group comprising a hydroxy or a sulfonate group and
   a non-functional group ($G^{NF}$) comprising a C$_1$-C$_6$ straight or branched (per)haloalkyl group.

9. The mixture according to claim 8 wherein polymers (P-A)-(P—C) comply with formulae (P-IA)-(P—IC):

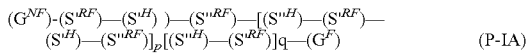

(P-IA)

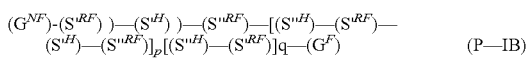

(P—IB)

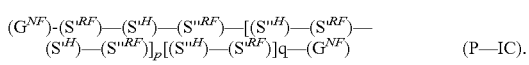

(P—IC).

wherein
($G^F$) is a straight or branched alkyl group comprising at least one carbon atom, optionally interrupted by ethereal oxygen atoms, said group comprising a hydroxy or a sulfonate group
($G^{NF}$) is a non-functional group comprising a C$_1$-C$_6$ straight or branched (per)haloalkyl group;
($S'^{RF}$) and ($S''^{RF}$), equal to or different from one another, are (per)fluoropolyether segments ($S^{RF}$);
($S^H$) and ($S''^H$), equal to or different from one another, are hydrogenated (poly)ether segments ($S^H$);
(E) and (E'), equal to or different from one another, represent a group comprising a hydroxy group, a sulfonate group or a (per)haloalkyl group;
p is 0 or a positive number; and
q is 0 or 1.

10. The mixture according to claim 9 in which:
functional groups ($G^F$) comply with formula —CH$_2$E$^1$, wherein E$^1$ is independently selected from hydroxy, nonaflate, triflate and tosylate;
non-functional groups ($G^{NF}$) are C$_1$-C$_6$ straight or branched (per)haloalkyl groups;
($S'^{RF}$) and ($S''^{RF}$), equal to or different from one another, are straight PFPE segments comprising a chain ($R_f$) complying with formula ($R_f$-III):

—(CF$_2$CF$_2$O)$_{a1}$(CF$_2$O)$_{a2}$—          ($R_{III}$):

wherein:
a1, and a2 are integers >0 such that the number average molecular weight is between 400 and 4,000, with the ratio a2/a1 being generally comprised between 0.2 and 5
($S^H$) and ($S''^{RF}$) comply with formula ($S^H$—I) —R$_h$—O—R$_h'$—wherein ($R_h$) and ($R_h'$) are both —CH$_2$—or one is —CH$_2$—and the other one is —CH$_2$CH$_2$—.

11. The mixture according to claim 4, wherein:
($S'^{RF}$) and ($S''^{RF}$) each independently comprise a fully or partially fluorinated polyoxyalkylene chain ($R_f$) having a number average molecular weight ranging from 400 to 5,000 and comprising repeating units (R°) selected from:
 (i) —CFXO—, wherein X is F or CF$_3$,
 (ii) —CFXCFXO—, wherein X, equal or different at each occurrence, is F or CF$_3$, with the proviso that at least one of X is —F,
 (iii) —CF$_2$CF$_2$CW$_2$O—, wherein each of W, equal or different from each other, are F, Cl, or H,
 (iv) —CF$_2$CF$_2$CF$_2$CF$_2$O—,
 (v) —(CF$_2$)$_j$—CFZ*—O—wherein j is an integer from 0 to 3 and Z* is a group of general formula —OR$_f^*$T, wherein R$_f^*$ is a fluoropolyoxyalkene chain comprising a number of repeating units from 0 to 10, said recurring units being selected from: —CFXO—, —CF$_2$CFXO—, —CF$_2$CF$_2$CF$_2$O—, —CF$_2$CF$_2$CF$_2$CF$_2$O—, with each X being independently F or CF$_3$ and T being a C$_1$-C$_3$ perfluoroalkyl group
($S^H$) and ($S''^H$) each independently comply with formula ($S^H$—I):

wherein ($R_h$) and ($R_h'$), equal to or different from one another, are selected from straight or branched divalent alkylene segments, each comprising at least one carbon atom; when ($R_h$) and ($R_h'$) comprise more than one carbon atom, they can optionally be interrupted by one or more ethereal oxygen atoms;
(E) and (E') are each independently selected from:
 a functional group ($G^F$) which is a straight or branched alkyl group comprising at least one carbon atom, optionally interrupted by ethereal oxygen atoms, said group comprising a hydroxy or a sulfonate group and
 a non-functional group ($G^{NF}$) comprising a C$_1$-C$_6$ straight or branched (per)haloalkyl group
p is 0 or a positive number; and
q is 0 or 1.

12. A method for the manufacture of a polymer mixture as defined in claim 1, said method comprising reacting a (per)fluoropolyether diol (Diol-1) with a (per)fluoropolyether diol in the form of a sulfonic diester (Diol-1*) in the presence of an inorganic or organic base wherein:
 either (Diol-1) and (Diol-1*) have the same average functionalities (F-1) and (F-1*), ranging from 1.2 to <1.98 or (Diol-1) and (Diol-1*) have different average functionalities, with the proviso that $[(F-1)+(F-1^*)]/2$ is lower than 1.98.

13. A method for the manufacture of a polymer mixture as defined in claim 1, said method comprising:

either reacting said mixture with a fully or partially halogenated monofunctional alkyl alcohol in the presence of an inorganic or organic base;

or reacting a (per)fluoropolyether diol (Diol-1) and a fully or partially halogenated monofunctional alkyl alcohol $R^2OH$ with a (per)fluoropolyether diol in the form of a sulfonic diester (Diol-1*) in the presence of an inorganic or organic base.

14. A method for the fluorination of a polymer mixture as defined in claim 1, said method comprising:

a) reacting a polymer mixture as defined in claim 1 wherein one or both ends in the mono and bifunctional polymers (P-A) and (P—B) comprise(s) a hydroxy group, with carbonyl fluoride $[C(O)F_2]$;

b) submitting the mixture from step a) to fluorination with fluorine in the presence of an inert gas until partial or complete replacement of the hydrogen atoms of the hydrogenated segments ($S^H$) with fluorine atoms;

c) reacting the mixture from step b) with an alcohol $R^2OH$, wherein $R^2$ represents straight or branched alkyl;

d) reacting the mixture from step c) with a reducing agent and e) optionally, converting the hydroxy groups of the mono- and bi-functional polymers contained in the mixture from step d) into a sulfonic group.

15. A monofunctional polymer comprising a plurality of (per)fluoropolyether segments ($S^{RF}$) joined together by hydrogenated (poly)ether segments ($S^H$), said polymers having two ends, wherein one end comprises a hydroxy or a sulfonate group and the other end terminates with a (per)haloalkyl group, with the proviso that the hydrogenated (poly)ether segments ($S^H$) are not segments of formula $-CH_2OCH_2OCH_2-$.

16. A method for the fluorination of a monofunctional polymer as defined in claim 15, said method comprising:

a) reacting a monofunctional polymer as defined in claim 15 wherein one ends of the polymer comprises a hydroxy group, with carbonyl fluoride $[C(O)F_2]$;

b) submitting the mixture from step a) to fluorination with fluorine in the presence of an inert gas until partial or complete replacement of the hydrogen atoms of the hydrogenated segments ($S^H$) with fluorine atoms;

c) reacting the mixture from step b) with an alcohol $R^2OH$, wherein $R^2$ represents straight or branched alkyl;

d) reacting the mixture from step c) with a reducing agent and e) optionally, converting the hydroxy groups of the mono- and bi-functional polymers contained in the mixture from step d) into a sulfonic group.

* * * * *